United States Patent [19]
Johnson

[11] Patent Number: 5,534,878
[45] Date of Patent: Jul. 9, 1996

[54] RADIO WITH RETRACTABLE ANTENNA

[75] Inventor: Terence Johnson, Fleet, England

[73] Assignee: Nokia Mobile Phones Limited, Salo, Finland

[21] Appl. No.: 36,939

[22] Filed: Mar. 25, 1993

[30] Foreign Application Priority Data

Apr. 8, 1992 [GB] United Kingdom .................... 9207639

[51] Int. Cl.⁶ .................................................. H01Q 1/24
[52] U.S. Cl. .......................... 343/702; 343/900; 343/901
[58] Field of Search .................................. 343/702, 888, 343/889, 900, 901, 895; H01Q 1/24

[56] References Cited

U.S. PATENT DOCUMENTS

| | | | |
|---|---|---|---|
| 4,531,232 | 7/1985 | Sakurai | 343/702 X |
| 4,725,845 | 2/1988 | Phillips | 343/702 |
| 4,868,576 | 9/1989 | Johnson, Jr. | 343/702 |
| 5,072,230 | 12/1991 | Taniyoshi et al. | 343/715 |
| 5,204,687 | 4/1993 | Elliott | 343/702 |

FOREIGN PATENT DOCUMENTS

| | | |
|---|---|---|
| 0419900A1 | 4/1991 | European Pat. Off. . |
| 0467822 | 1/1992 | European Pat. Off. . |
| 0523867A2 | 1/1993 | European Pat. Off. . |
| 0188902 | 11/1983 | Japan ...................................... 343/895 |
| 5167324 | 7/1993 | Japan ................................. H01Q 1/24 |
| 2219911 | 12/1989 | United Kingdom . |
| 2257835 | 1/1993 | United Kingdom . |
| 2257836 | 1/1993 | United Kingdom . |
| 2257837 | 1/1993 | United Kingdom . |
| 2257838 | 1/1993 | United Kingdom . |

*Primary Examiner*—Donald T. Hajec
*Assistant Examiner*—Tho Phan
*Attorney, Agent, or Firm*—Perman & Green

[57] ABSTRACT

A portable radio, eg a radio telephone, includes a slim, flexible antenna (2) retractable within a compartment (1a) of the radio housing (1). A flexible insulating sleeve (9) is provided in the compartment (1a) around the antenna (2) such that the antenna is able to slide relatively freely therein when the antenna is moved between the extended and retracted position. The sleeve (9) prevents the flexible antenna (2) from rattling against the internal parts of the housing (1) and helps to provide a more positive feel when the antenna is extended or retracted.

9 Claims, 2 Drawing Sheets

RADIO WITH RETRACTABLE ANTENNA

This invention relates to a radio particularly, but not exclusively a portable radio telephone, including a retractable antenna.

BACKGROUND OF THE INVENTION

It is well known to use a retractable antenna on portable radio equipment. Commonly the retractable antenna is rendered inoperative in the retracted position. Sometimes it is arranged that a second, eg internal, antenna may be rendered operative in place of the retractable antenna when the latter is retracted. Such an antenna configuration is disclosed in British patent application GB-A-2,219,911.

In the context of portable telephones it is desirable to make the retractable antenna as small as possible. In European patent application EP-A-0,467,822 there is disclosed a slim, flexible, retractable rod antenna having for example, a stiff coiled configuration enclosed within a dielectric sleeve. In this case a second antenna in the form of an antenna coil is carried by the outer end of the antenna rod. When the rod antenna is in the retracted position it is disconnected from the radio circuitry in favour of the coil antenna.

U.S. Pat. No. 4,868,576 discloses an antenna for a portable telephone, including a slim, retractable radiating element comprising a coil of silver plated beryllium copper wire. The coil is moulded inside a flexible plastic sleeve having an external diameter of only 100 mils (2.54 mm). In this case the retractable antenna is mounted to extend through a helical winding coupled to the radio circuitry. In the extended position the retractable element is capacitively coupled to the helical winding, but in the retracted position it is substantially decoupled therefrom.

A drawback with the slim retractable antennas disclosed in EP-A-0,467,822 and U.S. Pat. No. 4,868,576 is that, due to their flexibility, there is a tendency for them to move and rattle within the radio housing, particularly when in the retracted position. It will be noted that in these prior art examples the antenna is supported only in the region of the aperture in the housing through which the antenna extends. It will be appreciated therefore, that when the antenna is retracted, there is a substantial portion of the retractable antenna element which is present, but unsupported, within the radio housing. Because of the flexible nature of the retractable element the free end thereof within the radio housing is liable to move and rattle against the housing walls particularly when the radio is being carried or otherwise moved.

SUMMARY OF THE INVENTION

According to the present invention there is provided a radio comprising a housing, an antenna carried by the housing, the antenna being retractable between an extended position and a retracted position, and a flexible insulating sleeve provided inside the housing, wherein a portion of the antenna slides within the sleeve when the antenna is moved between the extended and retracted positions.

A radio in accordance with the invention has the advantage that the retractable antenna is less prone to rattle, due to the sheath effect of the insulating sleeve in which the antenna is arranged to slide. Also the complient nature of the flexible sleeve will assist in damping out any noise produced by antenna rattle.

Specifically the retractable antenna comprises an elongate radiating element. Flexibility of the antenna can be enhanced if it is made of a stiff coiled, spring-like, configuration.

Preferably the length of the sleeve is such as to enclose substantially the whole portion of the antenna which is present inside the housing when the antenna is in the retracted position. The sleeve may simply be provided loosely within the radio housing, for example, it may be provided to fit within two opposite wall portions of the housing. Alternatively, the sleeve may be fastened, eg with an adhesive, within the housing.

In one embodiment the sleeve is substantially straight along its length. In a different embodiment the sleeve is curved along its length. In this case the antenna bears against the internal surface of the sleeve during retraction or extension which helps to provide a firmer, more positive "feel" to the user. The flexibility of the sleeve prevents damage to the antenna from bearing against the internal surface.

BRIEF DESCRIPTION OF THE DRAWINGS

An embodiment of the invention will now be described, by way of example, with reference to the accompanying drawing, in which.

DETAILED DESCRIPTION OF THE INVENTION

Figure 1:
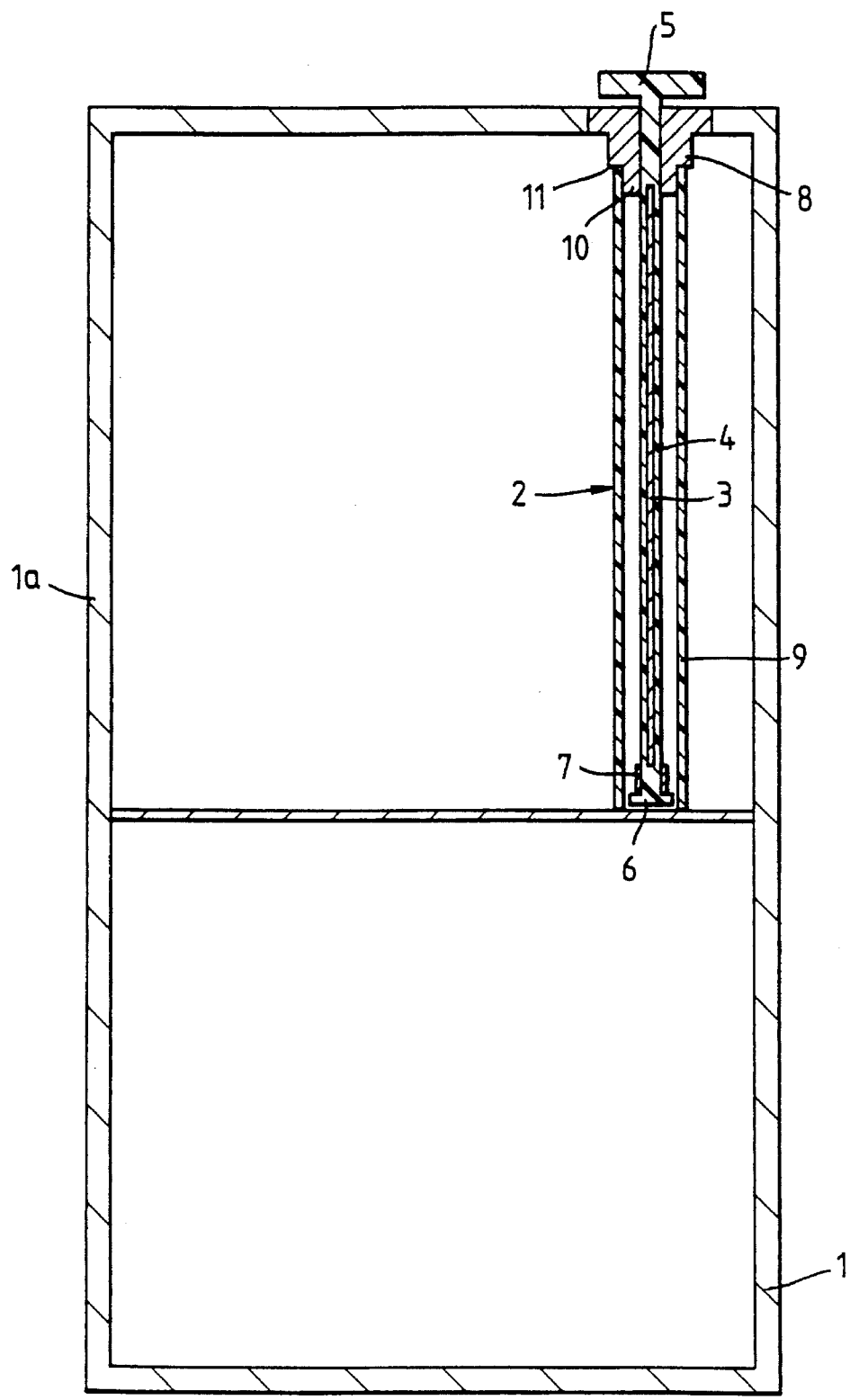
FIG. 1 is a schematic cross-section of a radio including a retractable antenna in accordance with the invention.

Referring to FIG. 1, the radio in the present embodiment is a portable transceiver unit particularly a portable radio telephone. The radio includes a housing 1 enclosing the radio circuitry (not shown), and a slim, retractable antenna 2. The housing 1 includes a compartment 1a which encloses the antenna in its retracted position.

Figure 2:
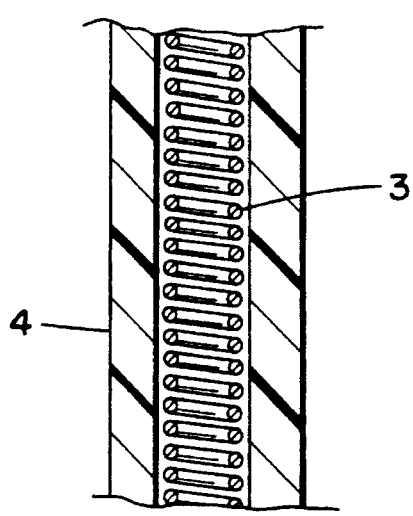
FIG. 2 is a partial enlarged schematic cross-sectional view of the radiating element and encapsulation material shown in FIG. 1.

The antenna 2 includes an elongate radiating element 3. In the present embodiment the radiating element comprises a stiff coil of wire, but may alternatively be formed as a solid conductive rod. Referring also to FIG. 2, a partial enlarged view of the coil radiating element 3 and encapsulation material 4 can be seen in greater detail. The coil configuration has the advantage that it imparts flexibility to the radiating element, which is thus less prone to breakage. The radiating element 3 is suitably one-quarter wavelength. The external diameter of the antenna at the area of the radiating element 3 is, for example, 2.5 mm. The antenna 2 further comprises flanges 5 and 6 at its upper and lower ends respectively. The lower flange 6 may have a diameter of 3.5 mm while the upper flange may have a wider diameter of, for example, 8 mm. The flanges 5 and 6 are formed integrally with the dielectric encapsulation material 4. A conductive collar 7 around the base of the antenna above the lower flange 6 is electrically connected to the lower end of the radiating element 3.

The antenna is mounted for slideable retracting movement through a conductive bush 8 provided in the top wall portion of the housing compartment 1a. In the fully retracted position shown in the Figure the upper flange 5 of the antenna 2 abuts the outer face of bush 8 to limit the movement thereof. In this position the antenna is effectively decoupled from the radio circuitry.

A flexible compliant insulating sleeve 9 made of polyvinylchloride and having an internal diameter of 4.2 mm is provided in the housing compartment 1a around the antenna 2. The bush 8 has a depending portion 10 having a smaller diameter than the main body of the bush, and defining a shoulder 11. The upper end of the sleeve 9 is push-fitted over the narrow-diameter portion 10 of the bush 8 until it abuts the shoulder 11. The length of the sleeve 9 is such that it is substantially straight along its length and extends the full way to the lower wall of the housing compartment 1a.

The antenna 2 is slideable within the sleeve 9, but the sleeve 9 is effective to prevent the antenna rattling against the walls of the housing 1. Moreover, because of the flexible nature of the antenna, at least the lower flange 6 thereof will tend to bear against the internal wall of the sleeve 9. The slight frictional force thus created will help to provide a more positive feel to the antenna when it is extended or retracted.

The antenna is extended by pulling on the outer flange 5. The antenna 2 can be moved until the lower flange 6 abuts the underside of the narrow-diameter extension 10 of bush 8 which prevents further extension of the antenna. In this position the conductive sleeve 7 at the base of the antenna engages, and so is in electrical contact with, the internal surface of the bush 8 which, in turn is connected to the radio circuitry. The radiating element 3 of the antenna 2 is thus coupled to the radio circuitry when it is in the fully extended position.

Figure 3:
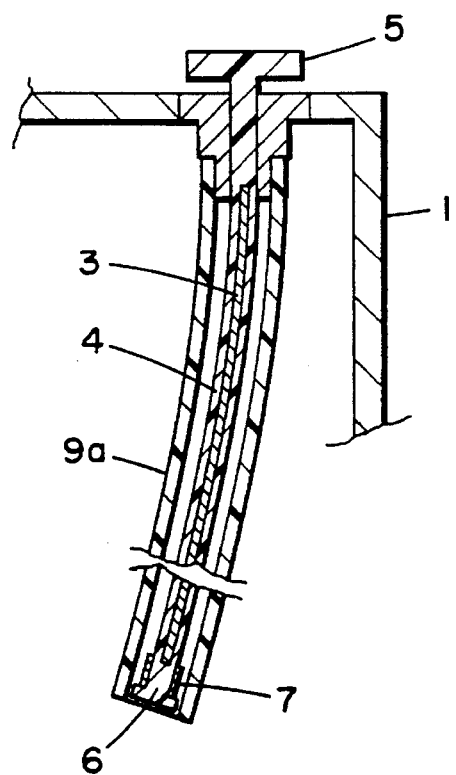
FIG. 3 is a partial schematic cross-sectional view of a retractable antenna similar to FIG. 1 having a longitudinally curved insulating sleeve.

In view of the foregoing description it will be evident that various modifications may be made within the scope of the present invention. For example, the flexible insulating sleeve may be cut longer so as to adopt a slightly curved configuration along its length. Referring to FIG. 3, where like numbers designate like members, a cross-sectional view of this alternate embodiment is shown. The sleeve 9a has a slight longitudinal curve along its length. In this case the sleeve 9 will further provide a more positive feel when the antenna is retracted or extended because the lower flange 6 of the antenna will bear more positively against the internal face of the sleeve when the antenna is moved. Also the insulating sleeve may be fixed more firmly within the housing, for example using adhesive either at a discrete location or locations along the length of the sleeve or continuously along the length of the sleeve. Furthermore, it will be appreciated that a second antenna may also be provided, as in the prior art, where the second antenna is rendered operative at least when the retractable element is in the retracted inoperative position.

I claim:

1. A radio comprising:

a housing for the radio, an antenna carried by the housing, the antenna being retractable between an extended position and a retracted position, and a flexible insulating sleeve provided inside the housing, wherein a portion of the antenna slides relative to and within the sleeve when the antenna is moved between the extended and retracted positions, the antenna being contactable with the flexible insulating sleeve along substantially the entire length of the sleeve.

2. A radio as claimed in claim 1, wherein the antenna comprises an elongate radiating element.

3. A radio as claimed in claim 2, wherein the elongate radiating element has a coiled configuration.

4. A radio as claimed in claim 1, wherein the length of the sleeve is such as to surround substantially the whole portion of the antenna present inside the housing when the antenna is in the retracted position.

5. A radio as claimed in claim 1, wherein the sleeve is fastened within the housing.

6. A radio as claimed in claim 1, wherein the sleeve is substantially straight along its length.

7. A radio as claimed in claim 1, wherein the sleeve is longitudinally curved along its length.

8. A radio as claimed in claim 1, wherein the sleeve is made of a plastic material.

9. A radio as claimed in claim 1, in the form of a portable radio telephone.

* * * * *